A. P. BRUSH.
PLANETARY GEARING.
APPLICATION FILED JULY 3, 1907.

901,518.

Patented Oct. 20, 1908.
4 SHEETS—SHEET 3.

Witnesses,
E. B. Gilchrist
H. C. Sullivan

Inventor,
Alanson P. Brush
By Thurston Woodward
Attorneys

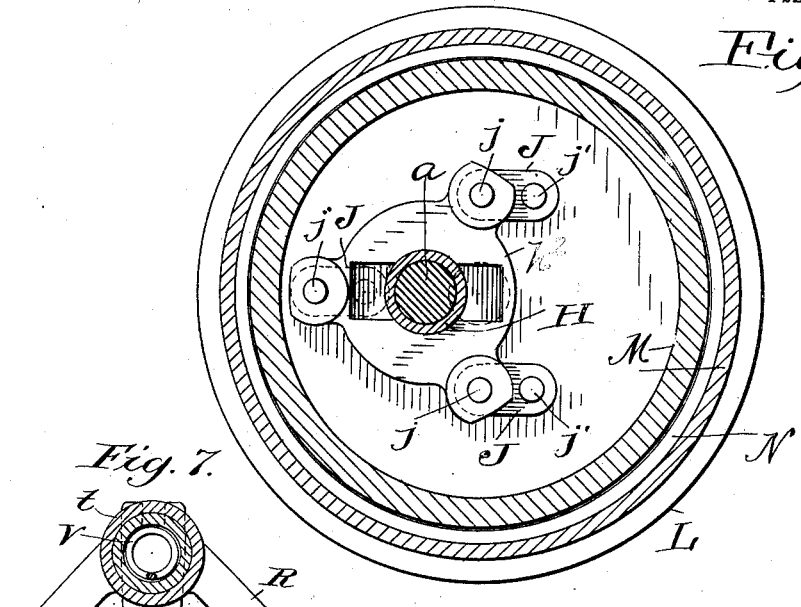
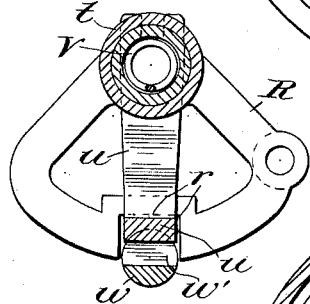
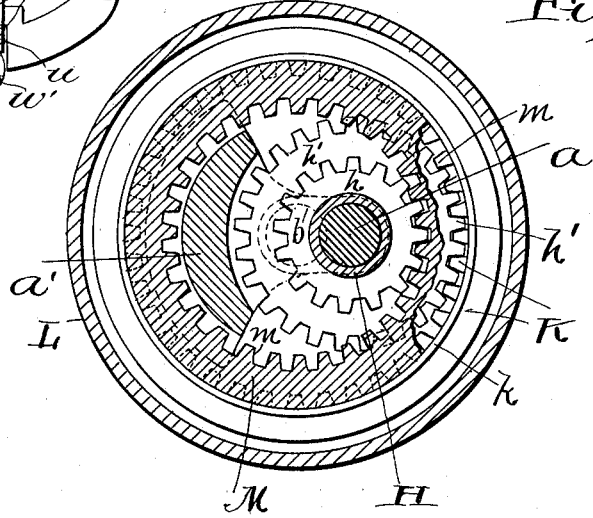

UNITED STATES PATENT OFFICE.

ALANSON P. BRUSH, OF DETROIT, MICHIGAN.

PLANETARY GEARING.

No. 901,518.　　　　Specification of Letters Patent.　　　Patented Oct. 20, 1908.

Application filed July 3, 1907. Serial No. 381,970.

*To all whom it may concern:*

Be it known that I, ALANSON P. BRUSH, a citizen of the United States, residing at Detroit, in the county of Wayne and State of Michigan, have invented a certain new and useful Improvement in Planetary Gearing, of which the following is a full, clear, and exact description.

This invention comprises various improvements in planetary gearing. Its object is to provide an efficient speed changing and reversing mechanism especially adapted for use on motor vehicles and the like, whose power shaft turns continually in the same direction.

Figure 1:
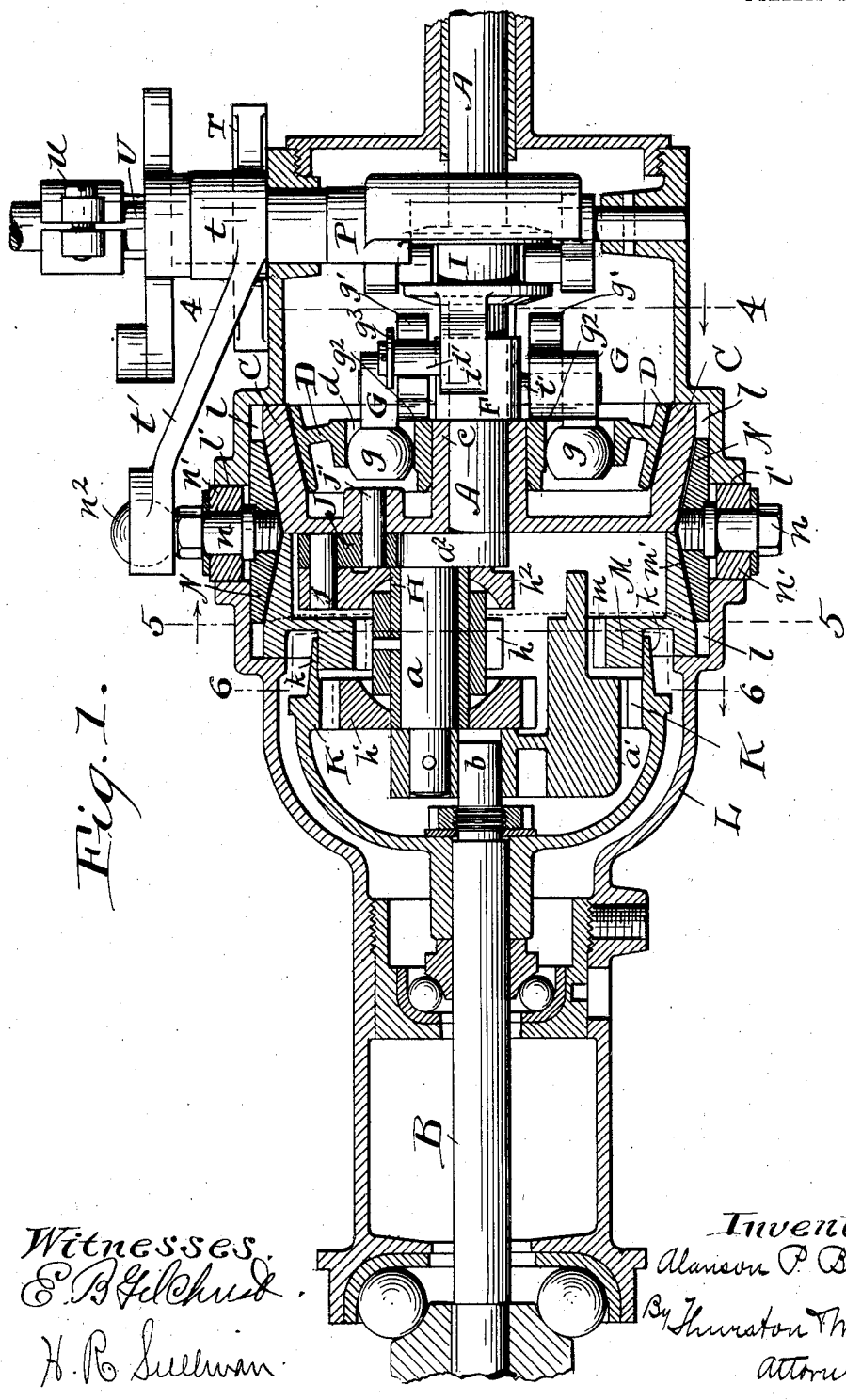
Figure 2:
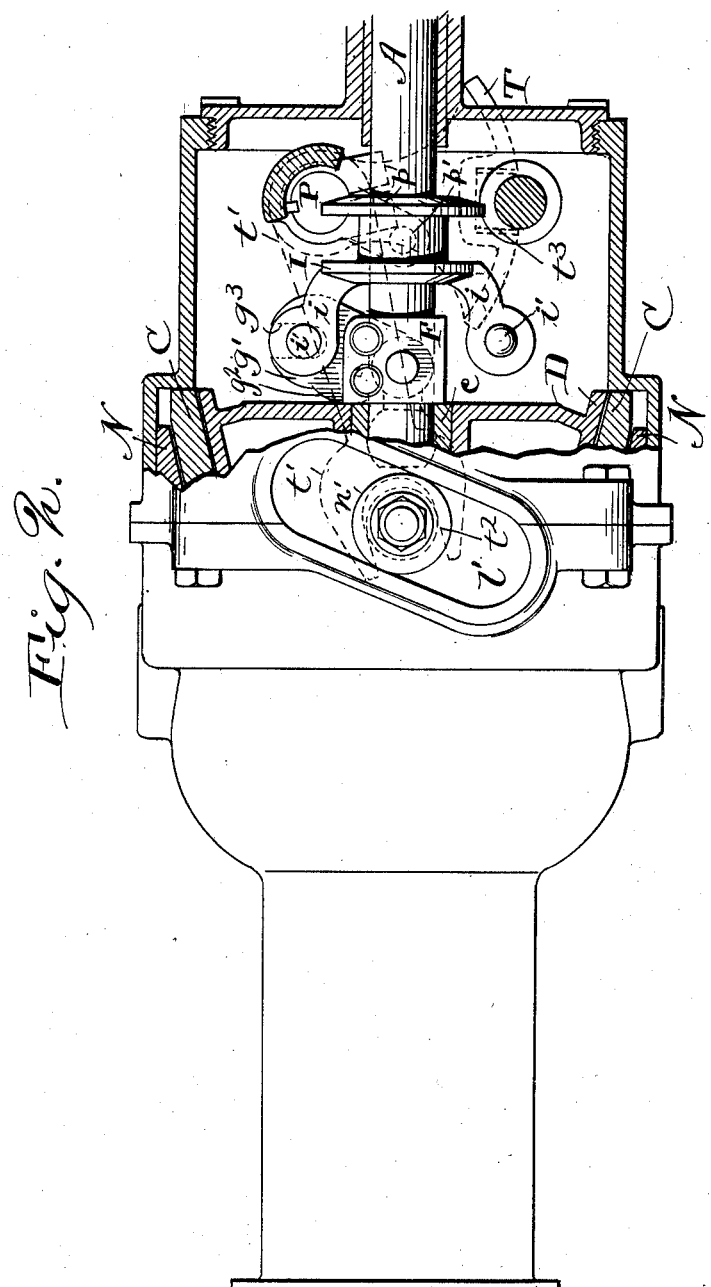
Figure 3:
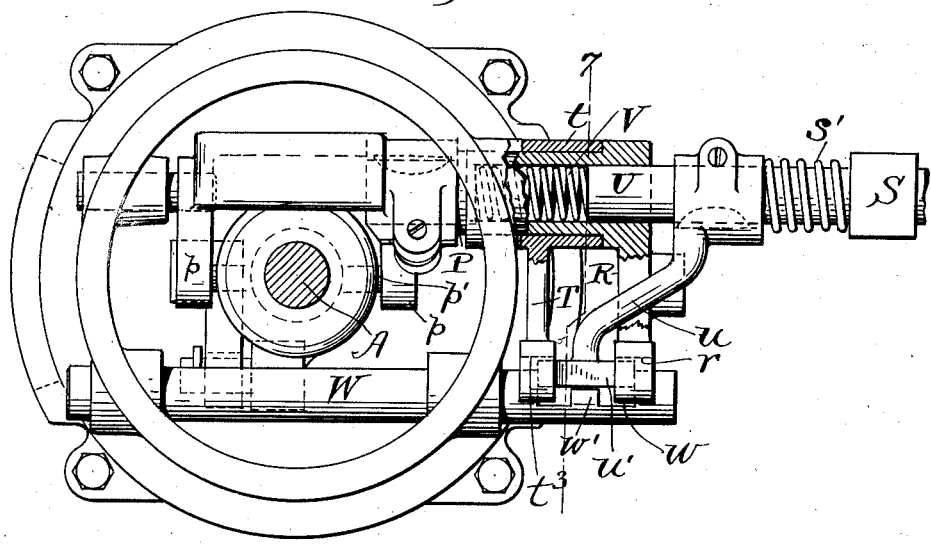
Figure 4:
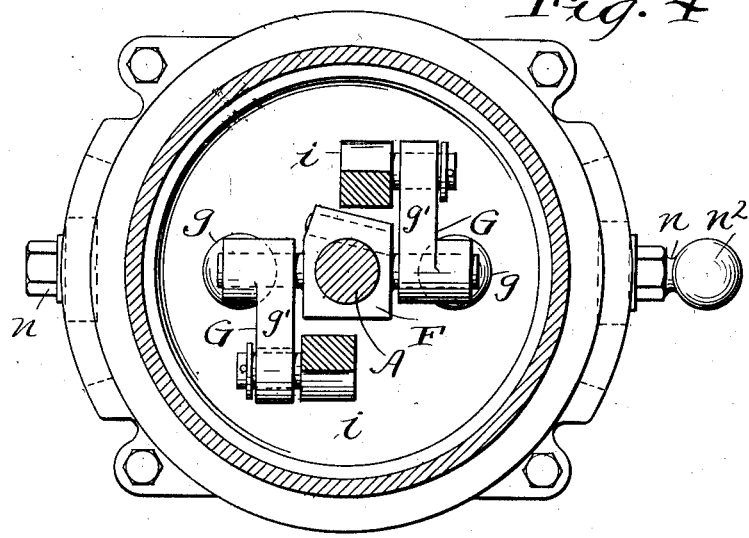

The invention will be particularly described in connection with the accompanying drawings, in which Figure 1 is a horizontal longitudinal section of the preferred embodiment of the invention. Fig. 2 is a side elevation partly sectioned. Fig. 3 is an end view from the right end of Fig. 1 when the end of the casing is removed. Fig. 4 is a transverse sectional view in the plane indicated by line 4—4 of Fig. 1. Fig. 5 is a transverse sectional view in the plane indicated by line 5—5 of Fig. 1; and Fig. 6 is a transverse sectional view in the plane indicated by line 6—6 of Fig. 1. Fig. 7 is a sectional view in the plane of line 7 on Fig. 3.

Referring to the parts by letters, A represents the power shaft, and B the shaft to be driven backward or forward at different speeds, as required. Both are mounted in a casing L which is to be fixed against rotation. On the inner end of the power shaft is a crank pin $a$, to the end of which a counterbalance $a'$ is secured. The end $b$ of shaft B enters a socket in this counterbalancing member alined with the shaft A. A clutch member C is loosely mounted on the power shaft. A clutch member D is loosely mounted on the hub $c$ of the member C. The clutch member C lies between the crank arm $a^2$ and a collar F which is fixed on shaft A. The coöperating clutch member D is movable toward and from the member C to bring their friction surfaces into and out of contact. The friction surfaces may be of any shape which permits their engagement and disengagement in the manner stated. As shown these two members have respectively female and male conical friction surfaces.

The clutch member D is operatively connected with the power shaft A, so that, although some lag between them is permitted, they are compelled substantially to rotate in unison. The connection includes a collar F fixed to shaft A, and two bell crank levers G mounted on diametrically opposed studs $f$ carried by said collar. One arm $g$ of each bell crank is substantially parallel with the shaft and enters a hole $d$ in the member D,— the end of this crank arm being substantially ball shaped. The other arm $g'$ of each bell crank lever is provided with a cam surface $g^2$ adapted for engagement with the outer face of the clutch member D, whereby through the rocking of the bell crank lever this clutch member may be forced into engagement with the clutch member C. In the outer end of each arm $g'$ is a notch $g^3$ which receives a pin $i'$ on an arm $i$ secured to an ordinary sliding sleeve I which may be moved lengthwise of the shaft by any suitable mechanism. When moved toward clutching member D, the cam surface $g^2$, engaging with the clutch member D, forces it longitudinally so as to press its friction surface into more or less intimate contact with the friction surface on the clutch member C. When this is done the member C, which carries a load, as will subsequently appear, tends to retard the rotation of clutch member D, or, in other words, causes it to lag behind the power shaft A. This lag will cause a slight rocking movement of the bell crank levers G on their axes, the result of which will be to cause the cam surface $g^2$ to more firmly press the clutch member D into frictional contact with the member C.

A sleeve H is rotatably mounted upon the crank pin $a$. To it are rigidly connected the gears $h$, $h'$ and a spider $h^2$. This spider is connected with the clutch member C by a plurality of links J, which lie between them. One end of each link is pivoted to the spider $h^2$, while the other end is pivoted to the clutch member C, the pivot pins $j$, $j'$ being the means for so connecting them. The distance between the axes of the pins of each link is equal to the distance between the axes of the driving shaft A and of its crank pin $a$, and a line drawn between these last two axes and lines drawn between the axes of the two pins of each link are and will at all times remain parallel.

An internal gear K is secured to the driven shaft B, and is extended so as to overhang the gear $h'$ with which it is constantly in mesh. This internal gear has a cylindrical flange $k$, in which a ring M is rotatively fitted,—and this ring is provided with an internal gear $m$ which is constantly in mesh with the gear $h$. On the outer surface of this ring M is a conical friction surface $m'$. The adjacent faces of the clutch member C and the ring M are in engagement, and both project into an annular groove $l$ in the casing L, so that their longitudinal movement is substantially prevented. Rotatably mounted within the casing L is a brake ring N having on its inner periphery the two oppositely inclined conical surfaces which are respectively opposed to and parallel with the oppositely inclined external conical surfaces of the members C and M. In the casing there is one or more spirally disposed slots $l'$,—preferably, two are provided at diametrically opposite points. A stud $n$ on the ring N passes through each slot. A roll $n'$ is rotatably mounted upon it, and one of said studs has a ball shaped outer end $n^2$. When it is desired to lock either the members C or M against rotation, power is applied to the stud $n$ to turn it in one direction or the other. When turned in one direction relative to the casing, it will be moved endwise to the right, for example, because of the spiral inclination of the slot $l'$, and when so moved will frictionally engage with the conical surface on the member C, which member will thereby be stopped in its rotation. The spiral slot $l'$ is so arranged that when the ring N is turned so as to cause the described clutching engagement, it will have to be turned in the same direction that the member C is turning in. Therefore, the torque applied to the ring N, due to its frictional contact with the moving member C, tends to turn the ring N in the same direction, thereby increasing the frictional pressure between the engaging surfaces. To lock clutch member M, this ring is turned in the opposite direction with the same result of automatically setting the brake firmly when once the frictional contact has been produced by the turning of said ring. It is apparent that this brake is self-setting when once the braking pressure is initiated, and that it is self-adjusting to the load or work required to stop either member C or M. While the ring N may turn through short arcs, it must stop when the pressure between it and either member C or M is so great that no further longitudinal movement of the ring N is permitted. Any suitable mechanism may be provided for moving this ring N and for operating the sliding sleeve I. That which is shown is of the selective type, and is the subject of another application. There is a rock shaft P suitably mounted which carries arms $p$ on which are pins $p'$ engaging in the annular groove in the sleeve I.

This shaft projects out of the casing and is provided with an operating arm R. A sleeve $t$ is loosely mounted on this shaft, and it has an arm T by means of which it may be operated, and another arm $t'$ which has a forked outer end $t^2$ which engages with the ball shaped end of stud $n^2$. A rock shaft U is rotatable in a bearing in the end of shaft P and in a suitable bearing S. A spring V, together with another spring $s'$ opposed to it, tends to move shaft U endwise into its normal position. Secured to the shaft U is an arm $u$, which passes through a wide opening in arm R, into a position between arms R and T. This arm $u$ has a T-shaped head $u'$ which normally enters notches $r$ and $t^3$ in the ends of the arms R and T. It also lies between the ends of a notch $w$ in an endwise movable locking bar W,—said notch being divided into two notches by an upwardly projecting lug $w'$. The locking bar also enters the notches $r$ and $t^3$, and prevents any movement of arms R and T.

When shaft U is moved endwise it withdraws the head $u'$ from engagement with one of the arms R and T, and at the same time it moves the locking bar W so as to release the other arm. That arm will now be moved in one direction or the other when the shaft U is rocked,—as it may be by any suitable mechanism.

The operation of the described mechanism is as follows. When the clutch member D is frictionally connected with the member C the entire train of gearing will rotate as a unit with the shaft A, and, consequently, the driven shaft B will rotate in unison with said power shaft. When, however, the brake ring N holds the member C against rotation, the driven shaft B will be rotated in the same direction as the power shaft, but at slow speed. Links J prevent the rotation of the spider $h^2$ and consequently of the sleeve H and of the gear $h'$. The rotation of the crank pin $a$, upon which said parts are rotatably mounted, carries the center of the gear $h'$ around with it, and, consequently, causes said gear to turn the internal gear K, but at slow speed compared with the power shaft B, because the gear $h'$ does not turn. When the brake ring N holds the ring M the gear $h$, through its intermeshing with the internal gear $m$, is turned backward upon the crank $a$. The gear $h'$ shares this motion, and therefore turns the internal gear K and consequently the driven shaft B backward, but at slow speed.

I claim:

1. In planetary gearing, the combination of a power shaft having a crank pin, an external gear mounted on said crank pin, a driven member, an internal gear fast to said driven member in mesh with said external gear, and means for locking said external gear to the power shaft.

2. In planetary gearing, the combination of a power shaft having a crank pin, an external gear mounted on said crank pin, a driven member, an internal gear fast to said driven member in mesh with said external gear, and means for turning said external gear backward upon the crank pin relative to the driving shaft.

3. In planetary gearing, the combination of a power shaft having a crank pin, an external gear mounted on said crank pin, a driven member an internal gear fast to said driven member in mesh with said external gear, and mechanism whereby said external gear may be locked to the driving shaft or prevented from rotation with said driving shaft or turned upon said crank pin backwards relative to the driving shaft.

4. In planetary gearing, the combination of the power shaft, a driven member, a non-rotatable casing in which both are mounted and from which they project, and planetary transmission gearing which is wholly within said casing and is arranged for transmitting motion from the power shaft to the driven member, a brake ring rotatably mounted within the casing and supported thereby, and means carried by the brake ring projecting through the casing, whereby the ring may be turned, said brake ring being arranged to cover said hole.

5. In planetary gearing, the combination of a power shaft having a crank, a driven member concentric with the power shaft and having an internal gear, two connected external gears rotatably mounted upon said crank, one of said gearings being in mesh with said internal gear, a ring mounted concentrically with the power shaft and having an internal gear with which the other external gear is in mesh, and means for preventing the turning of said ring.

6. In planetary gearing, the combination of a power shaft, a driven shaft having an internal gear, an external gear carried by the power shaft, and means which include an internal gear and another external gear for transmitting the reverse motion to the driven shaft.

7. In planetary gearing, the combination of a power shaft having a crank, a driven member concentric with the power shaft having an internal gear, a concentric rotatable ring having an internal gear, a brake for said ring two connected gears rotatably mounted on the crank pin and respectively in mesh with the internal gears, and means to prevent the turning of said gears.

8. In planetary gearing, the combination of a power shaft having a crank, a driven member concentric with the power shaft and having an internal gear, two connected external gears rotatably mounted upon said crank, one of said gears being in mesh with said internal gear, a ring mounted concentrically with the power shaft and having an internal gear with which the other external gear is in mesh, means for preventing the turning of said ring, and means preventing said external gears from rotating.

9. In planetary gearing, the combination of a power shaft having a crank, a driven member concentric with the power shaft and having an internal gear, two connected external gears rotatably mounted upon said crank, one of said gears being in mesh with said internal gear, a ring mounted concentrically with the power shaft and having an internal gear with which the other external gear is in mesh, means preventing the turning of said ring, and means for locking said external gears to the power shaft.

10. In planetary gearing, the combination of a power shaft having a crank, a driven member concentric with the power shaft having an internal gear, a concentric rotatable ring having an internal gear, two connected gears rotatably mounted on the crank pin and respectively in mesh with the internal gears, and means to prevent the turning of said ring, and mechanism whereby said external gears may be locked to the power shaft, or may be prevented from turning, at the will of the operator.

11. In planetary gearing, the combination of a power shaft having a crank pin, a driven member having an internal gear, an external gear mounted on the crank pin, a member concentric with the power shaft, links connecting said member with said external gear, and means compelling said member to rotate with the power shaft.

12. In planetary gearing, the combination of a power shaft having a crank pin, a driven member having an internal gear, an external gear mounted on the crank pin, a member concentric with the power shaft, links connecting said member with said external gear, mechanism by which said member may be prevented from rotating or compelled to rotate with the power shaft at will.

13. In planetary gearing, the combination of a power shaft having a crank pin, a driven member concentric with the power shaft having an internal gear, an intermeshing external gear mounted on the crank pin, a member concentric with the power shaft, means for locking it to the power shaft, means preventing its rotation, and a plurality of links connecting said member and external gear,—the axes of the link pins being parallel with the axis of the shaft, and said links being parallel with each other and with a line connecting the axis of the power shaft and the axis of said external gear.

14. In planetary gearing, the combination of the power shaft, a driven shaft, a casing in which they are mounted, transmission mechanism in said casing including the two rotatable members which are concentric with said shafts, a brake ring supported in the casing, and means for moving said ring into frictional contact with either of said members.

15. In planetary gearing, the combination of a power shaft, a driven shaft, a casing in which they are mounted, said casing having a spiral slot through its wall, transmission mechanism in said casing including two members which are rotatable about the axes of said shafts and which have oppositely inclined friction surfaces, a ring rotatably mounted in the casing outside of said members and having oppositely inclined internal friction surfaces, a stud secured to said ring and extending out of the casing through said slot therein, and means for turning said ring.

16. In planetary gearing, the combination of a power shaft, a driven shaft, a casing in which they are mounted, said casing having a spiral slot through its wall, transmission mechanism in said casing including two members which are rotatable about the axes of said shafts and which have oppositely inclined friction surfaces, a ring rotatably mounted in the casing outside of said members and having oppositely inclined internal friction surfaces, a stud secured to said ring and extending out of the casing through said slot therein, and a pivoted arm having a slot which embraces said stud.

17. Planetary gearing comprising a rotatable member having a braking surface, a brake for engaging therewith, means for producing initial frictional pressure between said brake and member, and means whereby the torque thereby produced increases said frictional pressure.

18. In planetary gearing, the combination of a power shaft, a driven member and transmission gearing therebetween, which includes two rotatable members, a single brake adapted to engage with either to stop its rotation, a friction clutch for connecting the one of said members with the power shaft, two operating devices one for the brake and one for the clutch, and means which may prevent the movement of either of said operating devices from its intermediate position, and which, when it permits one of said devices to be moved, prevents the movement of the other.

19. In planetary gearing, the combination of a power shaft, a driven member and transmission mechanism therebetween which includes a friction clutch, one of the members whereof has recesses in it, a bell-crank lever pivoted to the power shaft on an axis at right angles to its axis and has one of its arms extended into said recess, a sliding sleeve, and means operated thereby for engaging the other arm of said bell crank lever.

20. In planetary gearing, the combination of a power shaft having a crank pin, a driven member having an internal gear, an external gear rotatable upon the crank pin, a member rotatably mounted on the power shaft, means for locking it to the power shaft, means preventing it from turning with the power shaft, a link connection between said member and external gear, a rotatable ring concentric with said power shaft and having an internal gear, a second external gear mounted on the crank pin in mesh with the last mentioned internal gear and connected rigidly to the other external gear, a brake ring adapted to be moved into frictional engagement with either said ring or rotatable member, and to prevent the rotation of one without interfering with the rotation of the other.

In testimony whereof, I hereunto affix my signature in the presence of two witnesses.

ALANSON P. BRUSH.

Witnesses:
E. L. THURSTON,
E. B. GILCHRIST.